United States Patent

Kodama et al.

[11] Patent Number: 6,117,220
[45] Date of Patent: Sep. 12, 2000

[54] POLISHING COMPOSITION AND RINSING COMPOSITION

[75] Inventors: Hitoshi Kodama; Toshiki Owaki; Katsumi Tani; Noritaka Yokomichi, all of Aichi; Takashi Tokuue, Kanagawa; Norio Fujioka, Kanagawa; Tetsuya Sayama, Kanagawa, all of Japan

[73] Assignees: Fujimi Incorporated, Nishikasugai-gun; Toho Chemical Industry Co., Ltd., Tokyo, both of Japan

[21] Appl. No.: 09/441,295

[22] Filed: Nov. 16, 1999

[30] Foreign Application Priority Data

Nov. 17, 1998 [JP] Japan .................................. 10-326433
Nov. 17, 1998 [JP] Japan .................................. 10-326451

[51] Int. Cl.⁷ ........................................... C08H 5/20
[52] U.S. Cl. ............................. 106/3; 106/6; 106/286.1; 252/500; 252/521.5; 510/165; 510/175
[58] Field of Search ................................. 252/500–510, 252/511, 521.5; 106/3, 6, 286.1; 510/165–169, 175, 245

[56] References Cited

U.S. PATENT DOCUMENTS 5,997,620 12/1999 Kodama et al. ............................ 106/3
6,022,837 2/2000 Oowaki .................................. 510/165
6,027,669 2/2000 Miura et al. ......................... 252/518.1

*Primary Examiner*—Yogendra Gupta
*Assistant Examiner*—Derrick G. Hamlin
*Attorney, Agent, or Firm*—Oblon, Spivak, McClelland, Maier & Neustadt, P.C.

[57] ABSTRACT

A polishing composition for a memory hard disc, which comprises the following components (a) to (d):

(a) water,
(b) at least one compound selected from the group consisting of a polystyrenesulfonic acid, and its salts,
(c) a compound selected from the group consisting of an inorganic acid and an organic acid, and their salts, other than component (b), and
(d) at least one abrasive selected from the group consisting of aluminum oxide, silicon dioxide, cerium oxide, zirconium oxide, titanium oxide, silicon nitride and manganese dioxide.

11 Claims, No Drawings

POLISHING COMPOSITION AND RINSING COMPOSITION

The present invention relates to a polishing composition suitable for final polishing of the surface of a memory hard disk in the production of such a memory hard disk, i.e. a substrate for a magnetic disk to be used for a memory device useful for e.g. computers, or a rinsing composition suitable for pretreatment before and/or post treatment after the final polishing of the surface. More particularly, the present invention relates to a polishing composition which has a high anti-foaming property as compared with conventional polishing compositions and a high stock removal rate and is capable of forming an excellent treated surface while preventing formation of fine pits, microprotrusion or other surface defects, in the final polishing, or the pretreatment and/or post treatment of the final polishing, of a disk substrate (hereinafter referred to as "a substrate") to be used for a memory hard disk represented by e.g. a Ni—P disk, a Ni—Fe disk, an aluminum disk, a boron carbide disk or a carbon disk. Further, the present invention relates to a rinsing composition which has a high anti-foaming property as compared with conventional rinsing compositions and is capable of sufficiently removing swarf or substances deposited on the surface of a substrate.

Memory hard disks to be used for magnetic disk devices which are one of memory media for e.g. computers, tend to be small in size and large in capacity year after year, and magnetic media are changing from conventional coating type to thin film media formed by a sputtering method, a plating method or the like.

A substrate which is most widely employed at present, is one having electroless Ni—P plating applied to a blank material. The blank material is one having an aluminum or other base material for a substrate shaped by lathe processing by means of a diamond grinding wheel, by lapping by means of a PVA grinding wheel prepared by solidifying SiC abrasive material, or by other methods, for the purpose of imparting parallelism or flatness. However, by such shaping methods, it is not possible to completely remove a relatively large waviness. And, the electroless Ni—P plating will also be formed along such waviness of the blank material, and the waviness tends to remain in the substrate. Polishing is carried out for the purpose of removing the waviness of the substrate and making the surface flat.

Along with the trend for high capacity of the memory hard disk, the recording density is being improved at a rate of a few tens % every year. Accordingly, a space on a memory hard disk occupied by a predetermined quantity of information recorded, tends to be increasing narrow, and the magnetic force required for recording tends to be weak. Accordingly, for a recent magnetic disk device, it is required to minimize the flying height of the head, which is a space between the magnetic head and the memory hard disk. At present, the flying height of the head is reduced to a level of at most 0.02 $\mu$m.

Further, so-called texturing may sometimes be applied to form concentrically circular scorelines on the substrate after polishing, for the purpose of preventing sticking of a magnetic head for writing and reading information to a memory hard disk or preventing formation of scorelines in a certain direction different from the rotational direction of the memory hard disk on the substrate surface by polishing whereby the magnetic field on the memory hard disk tends to be non-uniform. Recently, for the purpose of further reducing the flying height, it has been proposed to carry out light texturing to form thinner scorelines on the substrate, or to use a non-textured substrate having no scorelines without carrying out texturing. A technology for supporting such a trend for a low flying height of a magnetic head, has been developed, and the trend for low flying height of a magnetic head has been further advanced.

The magnetic head flies along the surface shape of the memory hard disk which is rotating at a very high speed. If pits of a few lam are present on the surface of the memory hard disk, it may happen that information may not completely be written on the disk, thus leading to missing of information or failure in recording information, so-called "bit error", which causes an error.

Here, "pits" may be dents initially present in the substrate or dents formed on the substrate surface by polishing. Fine pits are dents with a diameter of less than about 50 $\mu$m, among them.

Accordingly, it is important to reduce the roughness of the substrate surface and at the same time necessary to completely remove a relatively large waviness, microprotrusions, pits and other surface defects.

For such a purpose, it has heretofore been common to employ single polishing finish by means of a polishing composition (hereinafter referred to as a "slurry" from its nature) comprising aluminum oxide or other various abrasives, water and various polishing accelerators. For example, JP-B-64-436 and JP-B-2-23589 disclose a polishing composition for a memory hard disk, which is made into a slurry by adding and mixing e.g. aluminum nitrate, nickel nitrate or nickel sulfate as a polishing accelerator to water and aluminum hydroxide. Further, JP-B-4-38788 discloses an acidic polishing composition for an aluminum magnetic disk, which comprises water, a fine powder of alumina abrasive material, gluconic acid or lactic acid as a polishing accelerator, and colloidal alumina as a surface improver.

However, with any one of such polishing compositions, it has been very difficult to satisfy, by single step polishing, all requirements to remove the surface defects or the relatively large waviness on the substrate surface, to reduce the surface roughness to a very low level in a predetermined period of time and to prevent formation of microprotrusions, fine pits and other surface defects. Accordingly, a polishing process comprising two or more steps, has been studied.

The desired degree of surface roughness is determined depending upon the process for producing the substrate, the final recording capacity as a memory hard disk and other conditions. Depending upon the desired degree of surface roughness, a polishing process may be employed which comprises more than two steps.

When a polishing process is carried out in two steps, polishing in the first step will be intended mainly for removing a relatively large waviness, large pits and other surface defects on the substrate surface, i.e. for adjusting the shape. Accordingly, a polishing composition which has a large correcting ability against the above-mentioned waviness or surface defects while minimizing deep scratches which may not be removed by the final polishing in the second step, rather than reducing the surface roughness, is required. Therefore, for the purpose of increasing the stock removal rate, an abrasive having a relatively large particle size is employed as the abrasive material in the composition.

Polishing in the second step i.e. the final polishing, is intended for minimizing the surface roughness of the substrate. Accordingly, the polishing composition is required to be able to minimizing the surface roughness and to prevent formation of microprotrusions, fine pits or other surface defects, rather than to have a large correcting ability against the large waviness or surface defects, which is required for the polishing in the first step.

Heretofore, as a means to reduce the surface roughness of the substrate, it has been common to employ an abrasive having a relatively small particle size as the abrasive material in the composition or to use a polishing composition containing a surfactant, irrespective of polishing of the first step or the second step. For example, JP-A-5-32959 discloses a polishing composition comprising water, an alumina abrasive and a fluorine type surfactant, JP-A-5-59351 discloses a polishing composition for a metal material, which comprises water, an alumina abrasive, a water-soluble metal salt as a polishing accelerator and a fluorine type surfactant, or JP-A-5-112775 discloses a polishing composition for a metal material, which comprises water, an alumina abrasive, a fluorine type surfactant and an amino acid.

However, as far as the present inventors are aware, when a polishing composition comprising an alumina abrasive having a relatively small particle size, particularly an average particle size of at most 2 $\mu$m, water, a water-soluble metal salt or an amino acid, and a fluorine-type surfactant, is employed, there has been a problem that the stock removal rate is very low and inadequate for practical production, and fine pits or scratches are likely to form, since the polishing ability of the composition is small. Further, such a composition is very much likely to undergo foaming, whereby the handling tends to be difficult, or there has been a problem in the waste water treatment. If an anti-foaming agent is added to this composition to suppress foaming, there has been a problem that the stock removal rate tends to further decrease, or the surface defects tend to be more likely to form. Further, the above-mentioned polishing composition containing a surfactant such as an alkylbenzene sulfonate, is also likely to undergo foaming, whereby the handling tends to be difficult, or there has been a problem in the waste water treatment.

On the other hand, to remove microprotrusions formed by polishing, in a step of cleaning the substrate, rinsing treatment of the substrate after polishing is carried out. This rinsing treatment is intended mainly to remove swarf and abrasive particles remaining on the surface of the substrate after polishing.

If, after polishing and texturing of a substrate, the used slurry (hereinafter referred to as "the waste liquid") is dried as deposited on the substrate surface, the slurry can not be completely removed in the subsequent cleaning step and thus is likely to cause formation of fine pits or microprotrusions. Further, if a substrate stained with the slurry after polishing and texturing, is introduced directly into a cleaning apparatus, the cleaning apparatus will be unduly loaded. Furthermore, the waste liquid remaining on the substrate is likely to attach to the body or clothing of the worker, or pollute the working site, thus leading to pollution of working environment. Prevention of such problems is also a purpose of the rinsing treatment of a substrate after polishing and texturing.

For the above purposes, it has heretofore been common that after polishing and texturing, the slurry is replaced by pure water or a rinsing composition containing a surfactant such as an alkylbenzene sulfonate, and the substrate is subjected to rinsing treatment in the same apparatus for polishing or texturing in a short period of time under a low load. However, by the rinsing with such pure water or a rinsing composition, there have sometimes been problems such that microprotrusions are rather likely to form, formation of microprotrusions can not constantly be prevented, the surfactant used can not completely be removed by a subsequent cleaning step and may remain on the substrate, and surface deffects other than microprotrusions, such as scratch marks or pits, are likely to form. Further, the above-mentioned rinsing composition containing a surfactant such as an alkylbenzene sulfonate, is very much likely to undergo foaming, whereby, like the above-described composition, the handling tends to be difficult, or there has been a problem in the waste water treatment. Therefore, a rinsing composition which has a high anti-foaming property has been desired whereby there will be no foaming, or foam, if formed, will disappear in a short period of time.

It is an object of the present invention to solve the above problems and to provide a polishing composition which has a high anti-foaming property as compared with conventional polishing compositions and a high stock removal rate and is capable of forming an excellent treated surface while preventing formation of fine pits, microprotrusions and other surface defects in final polishing of a substrate to be used for a memory hard disk. Further, another object of the present invention is to provide a rinsing composition which has a high anti-foaming property as compared with conventional rinsing compositions and is capable of adequately removing swarf or substances deposed on the surface of the substrate in the pretreatment and/or post treatment of the final polishing of the substrate.

The present invention provides a polishing composition for a memory hard disc, which comprises the following components (a) to (d):

(a) water, (b) at least one compound selected from the group consisting of a polystyrenesulfonic acid, and its salts, (c) a compound selected from the group consisting of an inorganic acid and an organic acid, and their salts, other than component (b), and (d) at least one abrasive selected from the group consisting of aluminum oxide, silicon dioxide, cerium oxide, zirconium oxide, titanium oxide, silicon nitride and manganese dioxide.

Further, the present invention provides a rinsing composition for a memory hard disc, which comprises the following components (a) to (c):

(a) water, (b) at least one compound selected from the group consisting of a polystyrenesulfonic acid, and its salts, and (c) a compound selected from the group consisting of an inorganic acid and an organic acid, and their salts, other than component (b).

The polishing composition of the present invention has a high anti-foaming property as compared with conventional polishing compositions and a high stock removal rate and is capable of preventing formation of fine pits, microprotrusions and other surface defects in the final polishing of a substrate to be used in a memory hard disk. The rinsing composition of the present invention has a high anti-foaming property as compared with conventional rinsing compositions and is capable of adequately removing swarf or substances deposited on the surface of the substrate.

Now, the present invention will be described in detail with reference to the preferred embodiments.

Polystyrenesulfonic Acid and its Salts

The polishing composition and the rinsing composition of the present invention contain at least one compound selected from the group consisting of a polystyrenesulfonic acid and its salts (hereinafter referred to as a "polystyrenesulfonic acid compound"), as component (b). In the present invention, the polystyrenesulfonic acid includes, in addition to one having an optional hydrogen on a benzene ring of polystyrene substituted by a sulfonic group, one having an optional substituent within a range not to impair the effects of the present invention and one containing an optional repeating unit in the basic structure within a range not to impair the effect of the present invention.

The polystyrenesulfonic acid compound is preferably a salt of a polystyrenesulfonic acid with sodium, potassium or other alkaline earth metals, or with monoethanolamine, diethanolamine, triethanolamine, morpholine, ammonia or other amine compounds.

The molecular weight of such a polystyrenesulfonic acid compound is not particularly limited. However, its weight average molecular weight is preferably from 2,000 to 1,000,000, more preferably from 10,000 to 50,000, most preferably from 10,000 to 30,000. Here, it is possible to adjust the balance of the stock removal rate and suppression of the surface defects by adjusting the molecular weight of the polystyrenesulfonic acid compound. Such a polystyrenesulfonic acid compound is incorporated in the polishing composition or the rinsing composition of the present invention preferably in a proportion of from 0.001 to 2 wt %, more preferably from 0.005 to 1 wt %, most preferably from 0.01 to 0.7 wt %, based on the total weight of the composition. If the content of this polystyrenesulfonic acid compound is increased, with the polishing composition, formation of fine pits or other surface defects tends to be reduced, and with the rinsing composition, the ability to remove swarf or deposited substances tends to increase. However, if it increases too much, the stock removal rate or the processing ability tends to decrease, or the effect for reducing pits or scratches or the ability to remove swarf or deposited substance, tends to decrease. Accordingly, a due care is necessary. On the other hand, if the content of the polystyrenesulfonic acid compound is too small, the effects of the present invention tend to be hardly obtainable.

The above-described polystyrenesulfonic acid compound should better be dissolved in the composition. A plurality of such polystyrenesulfonic acid compounds may be used in combination in an optional ratio within a range not to impair the effects of the present invention.

Inorganic Acid and Organic Acid, and their Salts

The polishing composition or the rinsing composition of the present invention contains, as component (c), at least one compound selected from the group consisting of an inorganic acid and an organic acid, and their salts (hereinafter referred to as an "acid compound"), other than the above-described component (b). Such an acid compound is preferably selected from the group consisting of nitric acid, nitrous acid, sulfuric acid, hydrochloric acid, molybdic acid, sulfamic acid, glycine, glyceric acid, mandelic acid, malonic acid, ascorbic acid, glutamic acid, glyoxylic acid, malic acid, glycolic acid, lactic acid, gluconic acid, succinic acid, tartaric acid and citric acid, and their salts and derivatives. Specifically, it includes aluminum nitrate, nickel nitrate, lithium nitrate, sodium nitrate, potassium nitrate, iron(III) nitrate, sodium nitrite, potassium nitrite, aluminum sulfate, nickel sulfate, lithium sulfate, sodium sulfate, iron(III) sulfate, ammonium sulfate, aluminum chloride, iron(III) chloride, ammonium chloride, sodium molybdate, ammonium molybdate, nickel sulfamate and ammonium sulfamate.

Such an acid compound should be dissolved in the composition. A plurality of such acid compounds may be used in combination in an optional ratio within a range not to impair the effects of the present invention.

The content of the acid compound in the polishing composition or the rinsing composition of the present invention varies depending upon the type of the acid compound. However, it is preferably from 0.01 to 30 wt %, more preferably from 0.1 to 25 wt %, most preferably from 0.5 to 20 wt %, based on the total weight of the composition. By increasing the amount of the acid compound, the stock removal rate tends to increase. However, if the amount is excessive, the chemical action tends to be strong, whereby microprotrusions, fine pits or other surface defects are likely to form. If the amount is too small, no adequate effect of the present invention tends to be obtainable.

Abrasive

The abrasive suitable for use as the main abrasive among components constituting the polishing composition of the present invention, is at least one member selected from the group consisting of aluminum oxide, silicon dioxide, cerium oxide, zirconium oxide, titanium oxide, silicon nitride and manganese dioxide.

The alumina oxide includes, α-alumina, δ-alumina, θ-alumina, κ-alumina and other morphologically different ones. Further, there is a one so-called fumed alumina from the method for its preparation.

The silicon dioxide includes colloidal silica, fumed silica and various other types different in the nature or the method for preparation.

The cerium oxide includes trivalent and tetravalent ones from its oxidation number, and it includes hexagonal system, tesseral system and face centered cubic system ones from its crystal system.

The zirconium oxide includes monoclinic system, tetragonal system and amorphous ones from its crystal system. Further, there is one so-called fumed zirconia from the method for its preparation.

The titanium oxide includes titanium monoxide, dititanium trioxide, titanium dioxide and other types from its crystal system. Further, there is one so-called fumed titania from the method for its preparation.

The silicon nitride includes α-silicon nitride, β-silicon nitride, amorphous silicon nitride and other morphologically different ones.

The manganese dioxide includes α-manganese dioxide, β-manganese dioxide, γ-manganese dioxide, δ-manganese dioxide, ε-manganese dioxide, η-manganese dioxide and other morphologically different ones from its morphology.

For the composition of the present invention, these abrasives may be employed optionally in combination as the case requires. When they are used in combination, the manner of the combination or their proportions, are not particularly limited.

The above-described abrasives are intended to polish the surface to be polished by the mechanical action as abrasive grains. Among them, the particle size of silicon dioxide is usually from 0.005 to 0.5 $\mu$m, preferably from 0.01 to 0.3 $\mu$m as an average particle size obtained from the surface area measured by a BET method. Likewise, the particle size of aluminum oxide, zirconium oxide, titanium oxide, silicon nitride or manganese dioxide is usually from 0.01 to 2 $\mu$m, preferably from 0.05 to 1.5 $\mu$m as an average particle size measured by a laser diffraction system particle size measuring apparatus LS-230 (manufactured by Coulter Co., U.S.A.). Further, the particle size of cerium oxide is usually from 0.01 to 0.5 $\mu$m, preferably from 0.05 to 0.45 $\mu$m as an average particle size observed by a scanning electron microscope.

If the average particle sizes of these abrasives exceed the above respective ranges, there will be a problem such that the surface roughness of the polished surface tends to be substantial, or scratches are likely to be formed. On the other hand, if the average particle sizes are smaller than the respective ranges, the stock removal rate tends to be extremely low, such being not practical.

The content of the abrasive in the polishing composition is usually from 0.1 to 50 wt %, preferably from 1 to 25 wt %, based on the total amount of the composition. If the content of the abrasive is too small, microprotrusions, fine pits or other surface defects are likely to be formed, and the stock removal rate may sometimes decrease. On the other hand, if it is too much, uniform dispersion tends to be hardly maintained, and the viscosity of the composition tends to be excessive, whereby the handling may sometimes tend to be difficult.

Polishing Composition and Rinsing Composition

The polishing composition of the present invention is prepared usually by dispersing or dissolving the above respective components in water i.e. by mixing and dispersing an abrasive (component (d)) selected from the group consisting of aluminum oxide, silicon dioxide, cerium oxide, zirconium oxide, titanium oxide, silicon nitride and manganese dioxide in a desired content in water (component (a)) and further dissolving the polystyrenesulfonic acid (compound (b)) and the acid compound (component (c)) therein. The method for dispersing or dissolving these components in water is optional. For example, they may be dispersed by supersonic dispersion or by stirring by means of a vane-type stirrer. The order of mixing them is optional, and dispersion of the abrasive and dissolution of the polystyrenesulfonic acid compound or the acid compound may be carried out simultaneously, or either one may precede the other.

For the purpose of stabilizing or maintaining the quality of the production, various known additives may further be added at the time of preparing the above polishing composition or rinsing composition, depending upon the type of the object to be treated, the treating conditions or other necessity for polishing treatment.

Examples of such further additives include the following.

(a) Celluloses such as cellulose, carboxymethylcellulose and hydroxyethylcellulose, (b) Water-soluble alcohols, such as ethanol, propanol and ethylene glycol, (c) Organic polyanion materials, such as a lignin sulfonate and a polyacrylate, (d) Water-soluble polymers (emulsifiers), such as polyvinyl alcohol, (e) Chelating agents, such as dimethyl glyoxime, dithizone, oxine, acetylacetone, glycine, EDTA and NTA, and (f) Fungicides such as sodium arginate and potassium hydrogencarbonate.

Further, the above-mentioned abrasive, the polystyrenesulfonic acid compound or the acid compound which is suitable for use in the polishing composition of the present invention, may be used as an auxiliary additive for the purpose other than the above-mentioned purpose, such as to prevent sedimentation of the abrasive.

The polishing composition or the rinsing composition of the present invention may be prepared in the form of a stock solution having a relatively high concentration, so that it may be stored or transported in that form, and may be diluted for use at the time of the actual polishing or rinsing operation. The above-mentioned preferred range of concentrations is the one at the time of the actual polishing or rinsing operation. When the composition is prepared in the form of such a stock solution, it is, of course, a liquid having a high concentration in the state where it is stored or transported. From the viewpoint of the handling efficiency, it is preferred that the composition is prepared in such a concentrated form.

With respect to the reason as to why the polishing composition of the present invention has a high stock removal rate as compared with conventional polishing compositions containing an alkylbenzene sulfonate or a fluorine-type surfactant and is capable of reducing formation of fine pits, microprotrusions or other surface defects, while presenting a polished surface having a small surface roughness, a detailed mechanism is not clearly understood, but it may be explained as follows taking a Ni—P plated substrate as an example.

Firstly, the polystyrenesulfonic acid compound has a function to suitably flocculate abrasive particles, whereby small abrasive particles will be flocculated with a relative weak flocculating force. In general, fine pits tend to be formed, when the polishing ability of the polishing composition is low. However, with the polishing composition of the present invention, the polishing ability is high, and a high stock removal rate can be obtained, since polishing particles having a relatively small particle size are flocculated with a relatively weak force. Further, this flocculation is gradually dissociated during the polishing treatment, whereby the damage to the treated surface is small, and the treated surface having a small surface roughness can be obtained. Further, surface defects such as fine pits (the portions where treating strains exist) will not selectively be treated to enlarge such defects by the mechanical action of the above-mentioned flocculated abrasive particles and the chemical action of the acid compound, whereby a uniform treated surface can be obtained. And, it is considered that the surface of swarf formed by polishing or the abrasive in the composition is covered by the polystyrenesulfonic acid compound, whereby it tends to scarcely deposit on the surface of the substrate, and formation of surface defects such as microprotrusions will thereby be reduced.

The rinsing composition of the present invention is used primarily for the purpose of removing swarf or deposited substances after the polishing treatment. However, by using this rinsing composition prior to the polishing treatment, the substrate surface is chemically affected, whereby the effect for increasing the stock removal rate or reducing the surface roughness after the polishing, will be obtained. Accordingly, use of the rinsing composition of the present invention is not limited after the polishing treatment, and it may be employed prior to the polishing treatment.

When polishing treatment is carried out by the polishing composition of the present invention, it is preferred to carry out rinsing treatment by the rinsing composition of the present invention prior to and/or after the polishing treatment. The rinsing composition of the present invention may be applied to a substrate treated or to be treated by an optional polishing composition. However, it is preferred to employ it in combination with the polishing composition of the present invention. By treating with the rinsing composition prior to the polishing treatment by the polishing composition of the present invention, the chemical effects can be supplemented. Further, by treating with the rinsing composition after the polishing treatment by the polishing composition of the present invention, it will be possible to effectively remove swarf or various components of the polishing composition remaining on the surface of the substrate.

Now, the present invention will be described in further detail with reference to Examples of the polishing composition and the rinsing composition of the present invention.

However, it should be understood that the present invention is by no means restricted to the specific constructions of such Examples which will be described below.

EXAMPLE 1

Polishing Test
Preparation of Polishing Composition

Firstly, as an abrasive, aluminum oxide, zirconium oxide or titanium oxide was dispersed in water by means of a stirrer to obtain a slurry having an abrasive concentration of 10 wt %. Then, an acid compound and a polystyrenesulfonic acid compound (or as a comparison, sodium alkylbenzenesulfonate, triethanolamine dodecylbenzenesulfonate or a perfluoroalkylamine oxide as a fluorine compound) were added thereto in the amounts as identified in Table 1, followed by mixing to obtain samples of Examples 1 to 9 and Comparative Examples 1 to 8.

TABLE 1

|  | Abrasive | Acid compound | Amount (wt %) | Polystyrenesulfonic acid compound | Amount (wt %) |
| --- | --- | --- | --- | --- | --- |
| Example 1 | Al oxide[*1] | Al nitrate[*4] | 0.5 | PSS-Na[*6] | 0.01 |
| Example 2 | Al oxide | Al nitrate | 0.5 | PSS-Na | 0.1 |
| Example 3 | Al oxide | Al nitrate[*5] | 0.5 | PSS-Na | 0.1 |
| Example 4 | Al oxide | Malic acid | 0.5 | PSS-Na | 0.1 |
| Example 5 | Al oxide | Gluconic acid | 0.5 | PSS-Na | 0.1 |
| Example 6 | Al oxide | Al nitrate | 0.5 | PSS-K[*7] | 0.1 |
| Example 7 | Al oxide | Al nitrate | 0.5 | PSS-TEA[*8] | 0.1 |
| Example 8 | Al oxide[*2] | Al nitrate | 0.5 | PSS-Na | 0.1 |
| Example 9 | Ti oxide[*3] | Al nitrate | 0.5 | PSS-Na | 0.1 |
| Comparative Example 1 | Al oxide | Al nitrate | 0.5 | — | — |
| Comparative Example 2 | Al oxide | Al sulfate | 0.5 | — | — |
| Comparative Example 3 | Al oxide | Malic acid | 0.5 | — | — |
| Comparative Example 4 | Al oxide | Gluconic acid | 0.5 | — | — |
| Comparative Example 5 | Ti oxide | Al nitrate | 0.5 | — | — |
| Comparative Example 6 | Al oxide | Al sulfate | 0.5 | ABS-Na[*9] | 0.1 |
| Comparative Example 7 | Al oxide | Al sulfate | 0.5 | DBS-TEA[*10] | 0.1 |
| Comparative Example 8 | Al oxide | Al sulfate | 0.5 | PAAO[*11] | 0.1 |

[*1]Al oxide: Aluminum oxide
[*2]Zr oxide: Zirconium oxide
[*3]Ti oxide: Titanium oxide
[*4]Al nitrate: Aluminum nitrate
[*5]Al sulfate: Aluminum sulfate
[*6]PSS-Na: Sodium polystyrenesulfonate
[*7]PSS-K: Potassium polystyrenesulfonate
[*8]PSS-TEA: Triethanolamine polystyrenesulfonate
[*9]ABS-Na: Sodium alkylbenzenesulfonate
[*10]DBS-TEA; Triethanolamine dodecylbenzenesulfonate
[*11]PAAO: Perfluoroalkylamine oxide Preparation of a Substrate for Polishing Test Using the above polishing compositions, substrates for polishing tests were prepared. To evaluate the two step polishing, substrates for the tests were prepared as follows.

Polishing Conditions (first step)

| Works: | 3.5" electroless Ni-P substrate |
| --- | --- |
| Number of works: | Ten disks |
| Polishing machine: | Double side polishing machine (table diameter: 640 mm) |
| Polishing pad: | Politex DG (manufactured by Rodel Inc., U.S.A.) |
| Treating pressure: | 80 g/cm$^2$ |
| Table revolutions: | 60 rpm |
| Polishing composition: | DISKLITE-3471 (manufacctured by FUJIMI INCORPORATED) |
| Dilution of the composition: | 1:2 pure water |
| Feed rate of the polishing composition: | 100 cc/min |
| Polishing time: | 5 minutes |

Polishing Test

Then, using the substrate having the first step polishing completed with the above polishing composition, a polishing test was carried out under the following condition.

Polishing conditions (second step)

| Works: | 3.5" electroless Ni-P substrate (first step polishing completed) |
| --- | --- |
| Number of works: | Ten disks |

-continued

| Polishing machine: | Double side polishing machine (table diameter: 640 mm) |
| --- | --- |
| Polishing pad: | Polilex DG (manufactured by Rodel Inc., U.S.A.) |
| Treating pressure: | 60 g/cm$^2$ |
| Table revolutions: | 60 rpm |
| Feed rate of the polishing composition: | 100 cc/min |
| Polishing time: | 5 minutes |

After the polishing, the substrate was sequentially washed and dried, and then the weight reduction of the substrate by polishing was measured, and from the average, the stock removal rate was obtained.

Further, by means of a differential interference microscope (magnification: 50 times), the substrate surface was inspected to measure the presence or absence of microprotrusions or fine pits. The evaluation standards were as follows.

◯: No substantial microprotrusions or fine pits were visually observed.

X: Microprotrusions or fine pits were substantially visually observed, and they were regarded as a problematic level.

The obtained results were as shown in Table 2.

Further, the above polishing compositions were stirred at 600 rpm by means of a homomixer, and the anti-foaming performance upon expiration of 30 seconds was visually evaluated. The evaluation standards were as follows.

◯: Foam was slightly observed, but it was practically no problematic level.

X: Foam was substantially observed, and it was a practically problematic level.

The obtained results were as shown in Table 2.

TABLE 2

| | Stock removal rate (μm/min) | Fine pits | Anti-foaming property |
| --- | --- | --- | --- |
| Example 1 | 0.38 | ◯ | ◯ |
| Example 2 | 0.36 | ◯ | ◯ |
| Example 3 | 0.18 | ◯ | ◯ |
| Example 4 | 0.15 | ◯ | ◯ |
| Example 5 | 0.15 | ◯ | ◯ |
| Example 6 | 0.30 | ◯ | ◯ |
| Example 7 | 0.32 | ◯ | ◯ |
| Example 8 | 0.15 | ◯ | ◯ |
| Example 9 | 0.17 | ◯ | ◯ |
| Comparative Example 1 | 0.40 | X | ◯ |
| Comparative Example 2 | 0.20 | X | ◯ |
| Comparative Example 3 | 0.20 | X | ◯ |
| Comparative Example 4 | 0.20 | X | ◯ |
| Comparative Example 5 | 0.23 | X | ◯ |
| Comparative Example 6 | 0.18 | X | X |
| Comparative Example 7 | 0.35 | X | X |
| Comparative Example 8 | 0.18 | X | X |

From the results shown in Table 2, it is evident that the polishing compositions of the present invention have high stock removal rates as compared with conventional polishing compositions and show excellent results with respect to the anti-foaming property and suppression of formation of fine pits.

EXAMPLE 2

Rinsing Test

Preparation of Rinsing Composition

Firstly, an acid compound was dispersed and dissolved in water by means of a stirrer to obtain an aqueous solution containing 0.5 wt % of the acid compound. Then, 0.1 wt % of a surfactant selected from the group consisting of a polystyrenesulfonate, a sodium alkylbenzenesulfonate and triethanolamine dodecylbenzenesulfonate, was added thereto to obtain the rinsing composition as identified in Table 3. In this manner, compositions of Examples 10 to 13 and Comparative Examples 9 to 11 were prepared.

TABLE 3

| | Acid compound | Amount (wt %) | surfactant | Amount (wt %) |
| --- | --- | --- | --- | --- |
| Example 10 | Aluminum nitrate | 0.5 | PSS-Na *1 | 0.1 |
| Example 11 | Aluminum nitrate | 0.5 | PSS-K *2 | 0.1 |
| Example 12 | Aluminum nitrate | 0.5 | PSS-TEA *3 | 0.1 |
| Example 13 | Malic acid | 0.5 | PSS-TEA | 0.1 |
| Comparative Example 9 | Aluminum nitrate | 0.5 | — | — |
| Comparative Example 10 | Aluminum nitrate | 0.5 | ABS-Na *4 | 0.1 |
| Comparative Example 11 | Aluminum nitrate | 0.5 | PSS-TEA *5 | 0.1 |

Rinsing Test

Firstly, a substrate for a polishing test was prepared under the following polishing conditions.

Polishing Conditions

| Works: | 3.5" electroless Ni-P substrate |
| --- | --- |
| Number of works: | Ten disks |
| Polishing machine: | Double side polishing machine (table diameter: 640 mm) |
| Polishing pad: | Politex DG (manufactured by Rodel Inc., U.S.A.) |
| Treating pressure: | 80 g/cm$^2$ |
| Table revolutions: | 60 rpm |
| Polishing composition: | DISKLITE-3471 (manufactured by FUJIMI INCORPORATED) |
| Dilution of the composition: | 1:2 pure water |
| Feed rate of the polishing composition: | 100 cc/min |
| Polishing time: | 5 minutes |

After completion of the polishing treatment, rinsing treatment was carried out immediately under the following rinsing conditions.

Rinsing Test

| Works: | 3.5" electroless Ni-P substrate (polishing completed) |
| --- | --- |
| Number of works: | Ten disks |
| Polishing machine: | Double side polishing machine (table diameter: 640 mm) |

-continued

| Polishing pad: | Polilex DG (manufactured by Rodel Inc., U.S.A.) |
| --- | --- |
| Treating pressure: | 40 g/cm$^2$ |
| Table revolutions: | 30 rpm |
| Feed rate of the rinsing composition: | 300 cc/min |
| Polishing time: | 300 seconds |

After completion of the rinsing treatment, the substrate was sequentially washed and dried, and then by means of a differential interference microscope (magnification: 50 times), the substrate surface was inspected to measure the presence or absence of microprotrusions or fine pits. The obtained results were as shown in Table 4.

Further, the above rinsing compositions were stirred at 600 rpm by means of a homomixer, and the anti-foaming performance upon expiration of 30 seconds, was visually evaluated. The obtained results were as shown in Table 4.

TABLE 4

|  | Fine pits | Anti-foaming property |
| --- | --- | --- |
| Example 10 | ○ | ○ |
| Example 11 | ○ | ○ |
| Example 12 | ○ | ○ |
| Example 13 | ○ | ○ |
| Comparative Example 9 | X | ○ |
| Comparative Example 10 | X | X |
| Comparative Example 11 | X | X |

From the results shown in Table 4, it is evident that the rinsing compositions of the present invention show excellent results with respect to the anti-foaming property and suppression of formation of fine pits as compared with conventional rinsing compositions.

As described in the foregoing, the polishing composition of the present invention has a high stock removal rate as compared with conventional polishing compositions and a high anti-foaming property and is capable of preventing formation of fine pits, microprotrusions or other surface defects in the final polishing of a substrate to be used for a memory hard disk, and the rinsing composition of the present invention has a high anti-foaming property as compared with conventional rinsing compositions and is capable of preventing formation of fine pits, microprotrusions or other surface defects in the pretreatment and/or post treatment of the final polishing of the substrate.

What is claimed is:

1. A polishing composition for a memory hard disc, which comprises the following components (a) to (d):
   (a) water,
   (b) at least one compound selected from the group consisting of a polystyrenesulfonic acid, and its salts,
   (c) a compound selected from the group consisting of an inorganic acid and an organic acid, and their salts, other than component (b), and
   (d) at least one abrasive selected from the group consisting of aluminum oxide, silicon dioxide, cerium oxide, zirconium oxide, titanium oxide, silicon nitride and manganese dioxide.

2. The polishing composition according to claim 1, wherein component (c) is selected from the group consisting of nitric acid, nitrous acid, sulfuric acid, hydrochloric acid, molybdic acid, sulfamic acid, glycine, glyceric acid, mandelic acid, malonic acid, ascorbic acid, glutamic acid, glyoxylic acid, malic acid, glycolic acid, lactic acid, gluconic acid, succinic acid, tartaric acid and citric acid, and their salts and derivatives.

3. The polishing composition according to claim 2, wherein component (c) is selected from the group consisting of aluminum nitrate, nickel nitrate, lithium nitrate, sodium nitrate, potassium nitrate, iron(III) nitrate, sodium nitrite, potassium nitrite, aluminum sulfate, nickel sulfate, lithium sulfate, sodium sulfate, iron(III) sulfate, ammonium sulfate, aluminum chloride, iron(III) chloride, ammonium chloride, sodium molybdate, ammonium molybdate, nickel sulfamate and ammonium sulfamate.

4. The polishing composition according to claim 1, wherein the content of component (d) is from 0.1 to 50 wt % based on the total weight of the polishing composition.

5. The polishing composition according to claim 1, wherein the content of component (c) is from 0.1 to 30 wt % based on the total weight of the polishing composition.

6. The polishing composition according to claim 1, wherein the content of component (b) is from 0.001 to 2 wt % based on the total weight of the polishing composition.

7. A rinsing composition for a memory hard disc, which comprises the following components (a) to (c):
   (a) water,
   (b) at least one compound selected from the group consisting of a polystyrenesulfonic acid, and its salts, and
   (c) a compound selected from the group consisting of an inorganic acid and an organic acid, and their salts, other than component (b).

8. The rinsing composition according to claim 7, wherein component (c) is selected from the group consisting of nitric acid, nitrous acid, sulfuric acid, hydrochloric acid, molybdic acid, sulfamic acid, glycine, glyceric acid, mandelic acid, malonic acid, ascorbic acid, glutamic acid, glyoxylic acid, malic acid, glycolic acid, lactic acid, gluconic acid, succinic acid, tartaric acid and citric acid, and their salts and derivatives.

9. The rinsing composition according to claim 8, wherein component (c) is selected from the group consisting of aluminum nitrate, nickel nitrate, lithium nitrate, sodium nitrate, potassium nitrate, iron(III) nitrate, sodium nitrite, potassium nitrite, aluminum sulfate, nickel sulfate, lithium sulfate, sodium sulfate, iron(III) sulfate, ammonium sulfate, aluminum chloride, iron(III) chloride, ammonium chloride, sodium molybdate, ammonium molybdate, nickel sulfamate and ammonium sulfamate.

10. The rinsing composition according to claim 7, wherein the content of component (c) is from 0.1 to 30 wt % based on the total weight of the rinsing composition.

11. The rinsing composition according to claim 7, wherein the content of component (b) is from 0.001 to 2 wt % based on the total weight of the rinsing composition.

* * * * *